United States Patent

[11] 3,573,633

| [72] | Inventor | Michael T. Marrero<br>Casselberry, Fla. |
|---|---|---|
| [21] | Appl. No. | 827,595 |
| [22] | Filed | May 26, 1969 |
| [45] | Patented | Apr. 6, 1971 |
| [73] | Assignee | The United States of America as represented by the Secretary of the Navy |

[54] TONE BURST TO FREQUENCY GENERATOR
10 Claims, 1 Drawing Fig.

[52] U.S. Cl................................................. 328/30,
328/37, 328/44, 328/71, 328/72, 324/78
[51] Int. Cl.................................................... H03k 23/00
[50] Field of Search........................................ 328/30, 44,
37, 71, 72, 73, 74, 75; 324/78 (D)

[56] References Cited
UNITED STATES PATENTS

| 3,137,818 | 6/1964 | Clapper........................ | 328/37X |
| 3,238,462 | 3/1966 | Ballard et al.................. | 328/44X |
| 3,304,504 | 2/1967 | Horlander..................... | 324/78X |
| 3,513,468 | 5/1970 | Fluegel......................... | 328/44X |

*Primary Examiner*—John S. Heyman
*Attorneys*—Joseph C. Warfield, John W. Pease and John F. Miller ABSTRACT: A flip-flop chain having feedback connections is arranged to measure one period of the carrier frequency of a tone burst signal. The output of the flip-flop chain gates a submultiple of a clock frequency into a count-up counter during the measured period. A countdown counter is arranged to count at clock frequency. Each time the countdown counter counts through zero, the count stored in the count-up counter is read out nondestructively into the countdown counter which simultaneously sends an output signal to a flip-flop. The divided and shaped output from the flip-flop is a continuous measure of the tone burst carrier frequency.

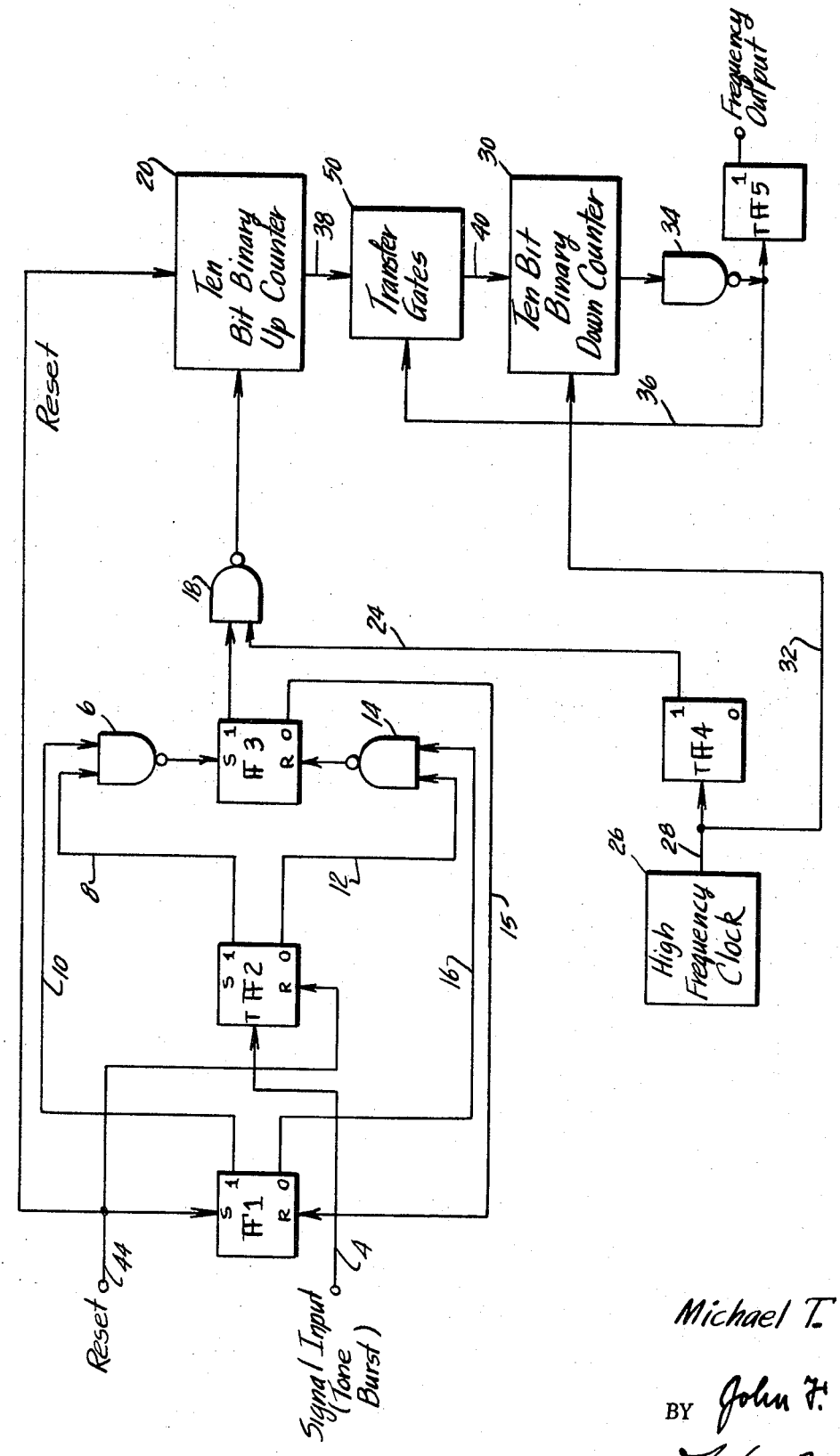

TONE BURST TO FREQUENCY GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention is in the field of electronic signal conversion. Heretofore great difficulty has been experienced in operating on transient phenomena such as, for example, a tone burst. Some practical method of preserving such transients without distortion has been needed to aid in analysis and utilization. Several expedients have been tried in the prior art, for example tone bursts have been stored on magnetic tape and played back through a closed loop system. However, among other disadvantages, magnetic tape systems are complex, large, and use considerable power. Mechanical tape transports are relatively unreliable. It is difficult to eliminate modulation of the tone burst in magnetic-recording and playback operations. Another expedient of the prior art has been to measure the period of one cycle with digital frequency measuring apparatus and convert the digital information into an analogue voltage which is used to control an oscillator. This technique suffers from inaccuracies caused by drift and inherent nonlinearities in circuit components. Applicant has solved this problem of the prior art by inventing a compact, low cost, rugged, and reliable circuit which accurately measures the period of the carrier frequency of a tone burst, converts the period into a sharply defined waveform, and reproduces this waveform exactly, without distortion, for as long a time as required. Digital techniques are employed throughout the operation for the sake of accuracy.

SUMMARY OF THE INVENTION

A chain of flip-flops are interconnected by gates and feedback triggering leads in such manner that the output of one flip-flop is coincident with one period of the carrier frequency of an incoming tone burst signal. The output of this flip-flop gates a frequency, which is the system clock frequency divided by two, into an up-counter. A down-counter counting at clock frequency is arranged to enable a set of transfer gates and generate a system output signal at the count of zero. The transfer gates nondestructively transfer the stored count in the up-counter to the down-counter.

BRIEF DESCRIPTION OF THE DRAWING

The drawing is a functional block diagram of the invention.

DESCRIPTION OF THE PREFERRED EMBODIMENT

Referring to the drawing, three flip-flops, FF1, FF2, and FF3, are connected in a chain modified with feedback connections. An input lead 4 adapted to receive a tone burst signal is connected to the toggle input of FF2, The 1 output terminal of FF2 is connected to one input of a NAND gate 6 by a lead 8. The other input of 6 is connected to the 1 output of FF1 by a lead 10. The output of NAND gate 6 is connected to the set input of FF3.

The 0 output of FF2 is connected by a lead 12 to one input of a NAND gate 14 which has an output connected to the reset terminal of FF3. The other input to gate 14 is connected by a lead 16 to the O output of FF1. The O output of FF3 is connected by a lead 15 to the reset input of FF1.

The 1 output of FF3 is connected by a lead 17 to one input of a NAND gate 18 which has an output connected to the input of a 10 bit binary count-up counter 20. The other input of 18 is connected to the 1 output of a flip-flop FF4 by a lead 24. The toggle input of FF4 is connected to receive a clock pulse train from a high frequency clock 26 over a lead 28. The arrangement is such that a 1 output from FF3 enables gate 18 to pass the divided clock frequency from 26 and FF4 to count-up counter 20.

A 10 bit binary countdown counter 30 is connected to receive the clock frequency from 26 over lead 28 and a lead 32. When down-counter 30 counts down to zero it develops an output signal which is connected through a gate 34 to the toggle input of a system output flip-flop FF5 and through a lead 36 to the enable inputs of an array of 10 transfer gates 50. Transfer gates 50 are connected by individual leads shown as cables 38 and 40 to nondestructively readout the count stored in up-counter 20 to the down-counter 30.

To measure the period of the carrier frequency of a tone burst, a reset signal is first applied to a lead 44. This assures that FF1 will be in a set condition and FF2 and FF3 will be in a reset condition at the start, regardless of any previous conditions which might have arisen by accident or operation. A tone burst signal is then applied to the system input lead 4. The first peak amplitude in the tone burst signal will toggle FF2. FF2 will generate an output signal on lead 8 which will pass through gate 6 because of an enabling voltage being applied to the other input of gate 6 over lead 10 from the 1 output of FF1 which is in a set condition. The output of gate 6 will set FF3. When FF3 changes from the reset to the set condition an output signal from its 0 terminal is sent over a lead 15 to reset FF1. This removes the enabling voltage from FF1 furnished over lead 10 to the gate 6 so that no further set signals can pass from FF2 to FF3.

While FF3 is in a set condition a 1 output signal is applied to gate 18, thereby enabling gate 18 to pass the divided clock frequency on lead 24 to the input of up-counter 20. Counter 20 counts until the second amplitude peak in the tone burst is received on lead 4. This switches FF2 to the reset condition. A O output signal from FF2 on lead 12 passes through gate 14 (which is now enabled by the O output of FF1) to reset FF3. This removes the enabling voltage from gate 18 so that no additional signals from clock 26 and FF4 are counted. Gate 18 will have been enabled for exactly one period of the tone burst carrier frequency and the count stored in 20 will be directly proportional to this period. Additional peaks in the tone burst signal will continue to switch FF2 but its output signals will have no further effect on the FF3 because gate 6 is now blocked by the lack of an enabling voltage from FF1 which remains in a reset condition. Gate 18 will not be enabled again until the flip-flop chain is reset by a signal on lead 44.

The 10 bit binary countdown counter 30 receives the clock pulse train from clock 26 and thus counts continuously. When 30 counts down to zero, an output signal is supplied to the toggle input of FF5. The same output pulse is furnished over lead 36 to enable 10 transfer gates in gate circuit 50, thereby nondestructively transferring the count stored in up-counter 20 to down-counter 30. Down-counter 30 will countdown from the transferred number at the clock frequency and develop another output pulse on reaching zero. This switches FF5 and again transfers the count stored in 20 to counter 30 through gate circuit 50.

Counter 30 counts down at twice the frequency applied to count-up counter 20 so counter 30 will countdown from the number transferred from 20 in one-half the time that gate 18 was enabled, that is, one-half a tone burst period. FF5 divides the output frequency from 30 by two so that the output of FF5 is a square wave having the same frequency as the tone burst. This frequency can be reproduced continuously after the tone burst has died away for as long as it is needed, and operated on in any desired manner.

I claim:

1. In a tone burst to frequency converter, an up-counter, a down-counter, a clock pulse source, means for causing said up-counter to count up at one-half the frequency of said clock pulse source for the duration of one period of said tone burst signal, means for causing said down-counter to count down at said clock pulse frequency, means for transferring the count stored in said up-counter to said down-counter when said down-counter counts to zero, and means for generating a system output signal in response to alternate output signals from said countdown counter.

2. The apparatus of claim 1, wherein said means for causing said up-counter to count-up comprise a chain of flip-flops, means for furnishing a tone burst signal to said chain, means interconnecting the flip-flops of said chain whereby said chain develops an output gating signal having a duration equal to one period of the carrier frequency of said tone burst signal.

3. The apparatus of claim 2, wherein said means for causing said up-counter to count-up further comprise a counter input gate for gating a divided clock pulse frequency to said up-counter, and means for enabling said counter input gate with said output gating signal from said chain.

4. The apparatus of claim 3, wherein said means for transferring the count in said up-counter to said down-counter comprise transfer gating means, and means for enabling said transfer gating means with an output signal from said down-counter when said down-counter counts to zero.

5. The apparatus of claim 4, wherein said means for generating a system output signal comprise an output flip-flop, means connecting the toggle input of said output flip-flop to receive a signal when said down-counter counts to zero, said output flip-flop developing an output signal having a period equal to the measured period of the carrier frequency of said tone burst signal.

6. The apparatus of claim 5, wherein said chain of flip-flops comprise a first flip-flop, a second flip-flop, and a third flip-flop, said output gating signal being an output from said third flip-flop, and said means for furnishing a tone burst to said chain being connected to the toggle input of said second flip-flop.

7. The apparatus of claim 6, wherein said means interconnecting said flip-flops comprise a first gate and a second gate, said first gate having an output connected to the set input of said third flip-flop, said second gate having an output connected to the reset input of said third flip-flop, and connecting means whereby said first flip-flop and said second flip-flop control said gates to thereby control the state of said third flip-flop.

8. The apparatus of claim 7, wherein said connecting means comprise a connection between the 1 output of said first flip-flop to one input of said first gate, a connection between the 1 output of said second flip-flop to a second input of said first gate, a connection between the O output of said first flip-flop to one input of said second gate, a connection between the O output of said second flip-flop to a second input of said second gate, and a feedback connection between the O output of said third flip-flop and the reset input of said first flip-flop.

9. The apparatus of claim 8, and including reset means for setting said first flip-flop, and resetting said second flip-flop and said up-counter.

10. The apparatus of claim 9, wherein said means for causing said up-counter to count-up further comprise a flip-flop connected between the output of said clock source and the input of said counter input gate, for dividing said clock frequency.